(12) United States Patent
Maezawa

(10) Patent No.: US 6,251,496 B1
(45) Date of Patent: Jun. 26, 2001

(54) MAGNETIC RECORDING MEDIUM METHOD AND APPARATUS FOR PRODUCING THE SAME

(75) Inventor: Yoshiharu Maezawa, Shiga-ken (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/220,212

(22) Filed: Dec. 24, 1998

(30) Foreign Application Priority Data

Dec. 16, 1997 (JP) .................................................. 9-358798
May 26, 1998 (JP) ................................................ 10-143875

(51) Int. Cl.⁷ ...................................................... G11B 5/66
(52) U.S. Cl. .................. 428/141; 428/336; 428/694 TR; 428/694 SG; 428/900; 427/128; 427/129; 427/130; 427/131
(58) Field of Search .......................... 428/141, 694 TR, 428/694 SG, 336, 900; 427/128–130, 131

(56) References Cited

U.S. PATENT DOCUMENTS

| | | | |
|---|---|---|---|
| 4,536,443 | * 8/1985 | Nagao | 428/336 |
| 4,626,480 | * 12/1986 | Shigeta | 428/634 T |
| 4,999,220 | * 3/1991 | Honda | 427/132 |
| 5,000,995 | * 3/1991 | Kishi | 428/65.7 |
| 5,112,669 | * 5/1992 | Yoden | 428/141 |
| 5,418,059 | * 5/1995 | Sugita | 428/332 |
| 5,492,774 | * 2/1996 | Tateno | 428/634 R |
| 5,525,398 | * 6/1996 | Takai | 428/141 |
| 5,662,984 | * 9/1997 | Honda | 428/141 |
| 5,796,533 | * 8/1998 | Kitaori | 360/17 |
| 5,851,660 | * 12/1998 | Tohma | 428/336 |

* cited by examiner

Primary Examiner—Leszek Kiliman
(74) Attorney, Agent, or Firm—Renner, Otto, Boisselle & Sklar

(57) ABSTRACT

A method for producing a magnetic recording medium includes the steps of causing a polymer film having a vapor-deposition surface to run; vaporizing a ferromagnetic metal material; depositing a thin film including the ferromagnetic metal material to the vapor-deposition surface of the polymer film in a vapor-deposition area where the polymer film runs with a tilt angle, with respect to a horizontal direction, in the range of about 20 degrees or more and about 80 degrees or less by oblique vapor deposition.

15 Claims, 10 Drawing Sheets

MAGNETIC RECORDING MEDIUM METHOD AND APPARATUS FOR PRODUCING THE SAME

BACKGROUND OF THE INVENTION

1. Field of the Invention

The present invention relates to a magnetic recording medium, a method and an apparatus for producing a magnetic recording medium, and in particular to a high recording density magnetic recording medium preferably used for information related equipment and audio-video equipment, a method and an apparatus for producing a high recording density magnetic recording medium.

2. Description of the Related Art

Recently, high-function thin film technologies have been remarkably developed and applied in a wide variety of fields. For example, the remarkable development in the magnetic recording medium is demonstrated by the improvement in the recording density. A conventional magnetic recording medium of a so-called coating type includes a ferromagnetic material such as $\gamma\text{-Fe}_2\text{O}_3$ powders, $\text{CrO}_2$ powders, or pure iron powders applied to a polymer film together with a binder such as a resin. Such a type of magnetic recording medium is used for audio and video tapes.

In order to improve the recording density, a metal thin film magnetic recording medium has been studied, which includes a ferromagnetic material such as Fe, Co, Ni or Cr vapor-deposited as a single metal material or an alloy or an insulating substrate such as a polymer film or a glass plate by ion plating, sputtering, cluster ion beam or the like. A vapor-deposition tape including such a metal material or an alloy applied to an insulating substrate by oblique vapor deposition has already been put into practice for use as a video-tape. Generally, a vapor-deposition tape is of an in-plane magnetic recording type, and includes a ferromagnetic metal film having an anisotropy (in a shape and/or in a magnetic property) in the tape plane. Such a ferromagnetic metal film is formed by obliquely growing ferromagnetic metal crystals using oblique vapor deposition.

FIG. 7 shows a conventional apparatus 70 for producing a metal thin film magnetic recording medium. The apparatus 70 utilizes a continuous winding vacuum vapor deposition to produce a metal thin film magnetic recording medium. The continuous winding vacuum vapor deposition is superior especially in the productivity and is a major candidate for a practical mass-production method.

The apparatus 70 operates in the following manner. A polymer film 72 wound around a feeding shaft 71 is continuously fed. The polymer film 72 is applied on a cooling drum 73 and wound around a winding shaft 74. Arrows A and B show the running direction of the polymer film 72. A ferromagnetic metal accommodated in a crucible 76 provided below the cooling drum 73 is irradiated with an electron beam 75 to melt and vaporize, thereby vapor-depositing the ferromagnetic metal to a surface of the polymer film 72. At this point, an unnecessary portion of the ferromagnetic metal is blocked by blocking plates 77a and 77b. In this specification, the surface of the polymer film 72 to which the ferromagnetic metal is vapor-deposited will be referred to as a "vapor-deposition surface". An area of the cooling drum 73 which is defined by the blocking plates 77a and 77b and to which the ferromagnetic metal is actually vapor-deposited on the vapor-deposition surface of the polymer film 72 will be referred to as a "vapor-deposition area". In FIG. 7, the vapor-deposition area is represented by reference numeral 72a. After the polymer film 72 having the ferromagnetic metal to a prescribed thickness is wound around the winding shaft 74, the polymer film 72 is cut or otherwise processed. Thus, a vapor-deposition tape is produced.

According to an alternative method using the apparatus 70, oxygen gas is supplied from an oxygen gas supply opening 78 to the vapor-deposition surface in the direction of arrow C (i.e., substantially opposite to the running direction of the polymer film 72), so that the depositing metal is oxidized (reactive deposition). A thin film recording medium produced by reactive deposition is formed of a ferromagnetic metal oxide or a ferromagnetic alloy oxide. In this specification, the term "thin film including a ferromagnetic metal material" refers to a thin film formed of a single ferromagnetic metal material, a thin film formed of a ferromagnetic alloy, and a thin film formed of a metal compound such as, for example, an oxide of a single ferromagnetic metal material or a ferromagnetic alloy. In the following description, the terms "ferromagnetic metal material" and "ferromagnetic metal thin film" will be used for simplicity. Unless otherwise specified, the term "ferromagnetic metal material" is replaceable with "ferromagnetic metal alloy" and "oxide of a ferromagnetic metal material", and the term "ferromagnetic metal thin film" is replaceable with "thin film including a ferromagnetic metal material"

However, the continuous winding vacuum vapor deposition has the following problems.

In order to obtain a sufficient electro-magnetic conversion characteristic with the conventional apparatus 70 shown in FIG. 7, the incident angle $\alpha$ of the metal depositing on the vapor-deposition surface is restricted by defining the vapor-deposition area 72a. The incident angle $\alpha$ is defined as being with respect to the normal to the vapor-deposition surface. The maximum incident angle $\alpha$ is represented as $\alpha$max, and the minimum incident angle $\alpha$ is represented as $\alpha$min.

For example, when the cooling drum 73 has a diameter of about 1 m, a vapor-deposition tape having a sufficient electro-magnetic conversion characteristic is obtained where the minimum incident angle $\alpha$min. is about 40 degrees so that the component incident at a smaller angle than about 40 degrees is blocked. Since the maximum incident angle $\alpha$max. cannot exceed 90 degrees, the adhering efficiency of the ferromagnetic metal reduces as the minimum incident angle $\alpha$ increases. The "adhering efficiency" is defined as the ratio of the weight of ferromagnetic metal deposited on the vapor-deposition surface with the total weight of the ferromagnetic metal vaporized, and is represented as a percentage.

In the case where the cooling drum 73 has a diameter of about 1 m, the minimum incident angle $\alpha$min. is about 40 degrees, and the maximum incident angle $\alpha$max. is about 90 degrees as shown in FIG. 7, the adhering efficiency is about 10 wt. %, which is seriously low.

As can be understood from FIG. 7, such a low adhering efficiency is due to a narrow expanding angle (vapor-deposition expanding angle) $\omega$ in the direction of incidence of the ferromagnetic metal. The "vapor-deposition expanding angle $\omega$" is defined as an angle determined by lines connecting the center of a vaporizing surface of the ferromagnetic metal in the crucible 76 and both ends of the vapor-deposition area 72a (vapor-deposition starting end and vapor-deposition terminating end) in a plane including the running direction of the polymer film 72. In the conventional method for producing a magnetic recording medium, the vapor-deposition expanding angle $\omega$ is restricted by the diameter of the cooling drum 73 to as small as 15 degrees.

In order to produce a ferromagnetic metal thin film having a prescribed thickness with the conventional method, the running speed of the polymer film 72 needs to be reduced due to such a low adhering efficiency. Accordingly, it is difficult to produce a vapor-deposition tape having a sufficient electro-magnetic conversion characteristic with a sufficient productivity. Under the circumstances, it has been strongly demanded to provide a method for producing a vapor-deposition tape for video equipment which has been more and more reduced in size due to a higher recording density and also a vapor-deposition tape for information equipment which has been demanded to realize higher density recording and lower cost.

In addition to the above-described problems, the present inventor has found that a ferromagnetic metal thin film produced by the conventional continuous winding vacuum vapor deposition has a problem in that the electro-magnetic conversion characteristic is lowered due to an excessively high surface roughness, which causes the space between the magnetic head and the ferromagnetic metal thin film to be excessively large. Such a problem is generally referred to as spacing loss.

FIG. 8A is a schematic of a vapor-deposition tape 80 produced by the apparatus 70 shown in FIG. 7. The polymer film 72 includes a base film 82 (for example, a PET film) and a polymer material 86 applied thereto, the polymer material 86 containing particles 84 (for example, silica particles having a diameter of about 10 nm) dispersed therein. Accordingly, the vapor-deposition surface of the polymer film 72 has a surface roughness (i.e., projections) of about 10 nm to about 30 nm. A purpose of forming a surface roughness at the vapor-deposition surface of the polymer film 72 is to lower the friction coefficient between the vapor-deposition tape and the magnetic head and thus to improve the running easiness. As shown in FIG. 8A, the ferromagnetic metal film 88 deposited on the vapor-deposition surface has projections 88a in correspondence with the projections.

The surface roughness of the ferromagnetic metal film 88 produced by the conventional method (i.e., the height of the projections 88a) is 1.5 times to twice the height of the surface roughness at the vapor-deposition surface of the polymer film 72 (which is proximate to the diameter of the particles 84). As shown in FIG. 8A, when the ferromagnetic metal film having a thickness of about 150 nm is formed on the polymer film 72, the height of the projections 88a (i.e., the surface roughness) is about 50 nm (=about 200 nm–about 150 nm), which is about 1.5 times the surface roughness of the polymer film 72 due to the silica particles 84 (about 30 nm; increase of about 20 nm). Such a large surface roughness of the ferromagnetic metal film is larger than the designed value, thus causing the problem of spacing loss. A reduction in the electro-magnetic conversion characteristic due to the excessive surface roughness brings serious problems especially in short-wavelength recording and reproduction. It is difficult to set the surface roughness of the polymer film 72 smaller because of the restriction on the usable particles. More specifically, a smaller-diameter particle has a lower dispersibility and is more expensive.

As a result of detailed studies, the present inventor has found that the increase in the surface roughness of the ferromagnetic metal film is caused by the influence of the shadowing of the component of the ferromagnetic metal deposited on the vapor-deposition surface at a large incident angle and the deposition speed of the ferromagnetic metal.

The cross section in FIG. 8A is along the running direction of the polymer film 72 during the production of the vapor-deposition tape 80. The running direction is from the right to the left of the sheet of FIG. 8A. On the vapor-deposition surface of the polymer film 72 running from the right to the left of the sheet, ferromagnetic metal comes from an upper left area of the sheet of FIG. 8A to be deposited on the polymer film 72. As shown in FIG. 7, the incident angle $\alpha$ of the ferromagnetic metal is high and the deposition speed is low at the deposition starting end. The incident angle $\alpha$ is decreased and the deposition speed is raised as the deposition terminating and is approached. As a result, the projections are developed from the forward end of the running direction and as a result, a recessed area where the ferromagnetic metal is not sufficiently supplied (i.e., shadow) is formed rear to the projections. Such a surface state of the vapor-deposition tape can be observed by an atomic force microscope (AFM). As shown in FIG. 8C, recessed areas (black areas) are formed by shadowing rear to the projections in terms of the running direction R of the tape. The recessed areas shown in FIG. 8C will be described later in the section of the comparative example 1.

FIG. 8B shows a result of observation of the ferromagnetic metal film 88 of the vapor-deposition tape 80 (FIG. 8A) by a transmission electron microscope (TEM). As shown in FIG. 8B, column-like crystals 89 of the ferromagnetic metal increase in size as the surface is approached. Such a phenomenon is considered to occur since the incident angle $\alpha$ and thus the deposition speed do not linearly change with respect to time due to the running of the polymer film 72 on the circumferential surface of the cylindrical cooling drum 73 according to the conventional method as shown in FIG. 7. Since the column-like crystals of the ferromagnetic metal shown in FIG. 8B are not grown in a constant direction, the vapor-deposition tape is low in anisotropy and thus is low in electro-magnetic characteristic.

A further study of the present inventor has found another problem of the conventional method. Since the vapor-deposition area is a part of the circumferential surface of the cooling drum 73, the temperature of the vapor-deposition surface curing the vapor deposition is constant, and thus the generation of the crystal nuclei and crystal growth are performed at the same temperature. As a result, the generation of the crystal nuclei is easily influenced by external disturbance, unstable and low in regularity. Accordingly, the ability of maintaining the magnetic characteristics and the square ratio in the hysterisis are reduced, which lowers the electro-magnetic conversion characteristic.

SUMMARY OF THE INVENTION

According to one aspect of the invention, a method for producing a magnetic recording medium includes the steps of causing a polymer film having a vapor-deposition surface to run; vaporizing a ferromagnetic metal material; depositing a thin film including the ferromagnetic metal material to the vapor-deposition surface of the polymer film in a vapor-deposition area where the polymer film runs with a tilt angle ($\theta$), with respect to a horizontal direction, in the range of about 20 degrees or more and about 80 degrees or less by oblique vapor deposition.

In one embodiment of the invention, the polymer film is run so that the tilt angle ($\theta$) of the polymer film in the vapor-deposition area changes by about 30 degrees or less.

In one embodiment of the invention, the polymer film is run so that the tilt angle ($\theta$) of the polymer film is constant throughout the vapor-deposition area.

In one embodiment of the invention, the polymer film is run on a plate-like endless belt continuously running on at least two cooling drums.

In one embodiment of the invention, a vapor-deposition expanding angle (ω) of the ferromagnetic metal material incident on the vapor-deposition area is set to be in the range of about 18 degrees or more and about 60 degrees or less.

In one embodiment of the invention, the polymer film is run so that an incident angle (α) of the ferromagnetic metal material incident on the vapor-deposition area with respect to the normal to the vapor-deposition surface is larger at a vapor-deposition starting end than at a vapor-deposition terminating end of the vapor-deposition area.

In one embodiment of the invention, the incident angle (α) of the ferromagnetic metal material incident on the vapor-deposition area with respect to the normal to the vapor-deposition surface is set to be about 35 degrees or more.

In one embodiment of the invention, the plate-like endless belt is set to have a surface temperature higher at a vapor-deposition stating end than at a vapor-deposition terminating end of the vapor-deposition area.

According to another aspect of the invention, a method for producing a magnetic recording medium includes the steps of causing a polymer film having a vapor-deposition surface to run; vaporizing a ferromagnetic metal material; depositing a thin film including the ferromagnetic metal material to the vapor-deposition surface of the polymer film in a vapor-deposition area by oblique vapor deposition. The ferromagnetic metal material is incident on the vapor-deposition surface of the polymer film in an area where an incident angle (α) of the ferromagnetic material with respect to the normal to the vapor-deposition surface is in the range of about 35 degrees to about 90 degrees.

According to still another aspect of the invention, an apparatus for producing a magnetic recording medium includes first and second cooling drums; a plate-like endless belt held on the first and second cooling drum to be run; and a vapor source for supplying a vaporized ferromagnetic metal material to a vapor-deposition surface of a polymer film run on a surface of the plate-like endless belt. The vaporized ferromagnetic metal material reaches to a vapor-deposition area where the polymer film is run with a tilt angle (θ), with respect to a horizontal direction, in the range of about 20 degrees or more and about 80 degrees or less.

In one embodiment of the invention, a vapor-deposition expanding angle (ω) of the ferromagnetic metal material incident on the vapor-deposition area is in the range of about 18 degrees or more and about 60 degrees or less.

In one embodiment of the invention, an incident angle (α) of the ferromagnetic metal material incident on the vapor-deposition area with respect to the normal to the vapor-deposition surface is about 35 degrees or more.

In one embodiment of the invention, the plate-like endless belt has a surface temperature higher at a vapor-deposition starting end than at a vapor-deposition terminating end of the vapor-deposition area.

According to still another aspect of the invention, an apparatus for producing a magnetic recording medium includes first and second cooling drums; a plate-like endless belt held on the first and second cooling drum to be run; and a vapor source for supplying a vaporized ferromagnetic metal material to a vapor-deposition surface of a polymer film run on a surface of the plate-like endless belt. The ferromagnetic metal material is incident on the vapor-deposition surface of the polymer film in an area where an incident angle (α) of the ferromagnetic material with respect to the normal to the vapor-deposition surface is in the range of about 35 degrees to about 90 degrees.

According to still another aspect of the invention, a magnetic recording medium includes a polymer film including a surface having an average surface roughness of about 5 nm to about 50 nm; and a magnetic thin film including a ferromagnetic metal material obliquely vapor-deposited on the surface of the polymer film. The ratio of the average surface roughness of the ferromagnetic thin film with respect to the average surface roughness of the polymer film is in the range of about 1.0 to about 1.3.

In one embodiment of the invention, the ferromagnetic thin film has a thickness in the range of about 5 nm to about 300 nm.

According to the present invention, a thin film including a ferromagnetic metal material is deposited by oblique vapor deposition to a vapor-deposition of a polymer film in a vapor-deposition where the polymer film runs at a tilt angle (θ) with respect to the horizontal direction of about 20 degrees or more and about 80 degrees or less. Thus, the metal material reaches the vapor-deposition surface at an appropriate incident angle and also a sufficiently wide vapor-deposition angle is obtained. In the case where the tilt angle is low, high adhering efficiency can be obtained. In the case where the tilt angle is high, a magnetic film having a satisfactory electro-magnetic characteristic (i.e., electro-magnetic conversion characteristic) can be obtained.

In the case where the polymer film is run so that a change (Δθ) of the tilt angle (θ) is about 30 degrees or less, the column-like crystals of the ferromagnetic metal material grow and a satisfactory ferromagnetic metal thin film can be obtained. Specifically in the case where the polymer film is run so that the tilt angle is constant throughout the vapor-deposition area (Δθ=0), a maximum possible uniformity of the resultant ferromagnetic metal film is obtained. Practically, the two conditions are easily fulfilled by causing the polymer film on a plate-like endless belt continuously running on two or more cooling drums.

In the case where the vapor-deposition expanding angle (ω) of the ferromagnetic metal material incident on the vapor-deposition area is in the range of about 18 degrees or more and about 60 degrees or less, the magnetic recording medium is produced at a high productivity while maintaining the satisfactory magnetic property.

In the case where the polymer film is run so that an incident angle of the ferromagnetic metal material incident on the vapor-deposition area with respect to the normal to the vapor-deposition surface is larger at a vapor-deposition starting end than at a vapor-deposition terminating end of the vapor-deposition area, the column-like crystals of a ferromagnetic metal material can be stably grown.

In the case where the incident angle of the ferromagnetic metal material incident on the vapor-deposition area with respect to the normal to the vapor-deposition surface is about 35 degrees or more, the surface roughness of the resultant vapor-deposition tape is controlled to be within an appropriate range. Practically, the surface roughness of the resultant vapor-deposition tape can be in the range of about 1.0 to about 1.3 times the surface roughness of the polymer film and about 50 nm or less. Thus, the problem of spacing loss which occurs conventionally is solved. The electro-magnetic characteristic of the magnetic film can be further improved by setting the minimum incident angle αmin. about 38 degrees or larger. In view of the electro-magnetic characteristic, the maximum incident angle αmax. is preferably not larger than about 87 degrees, more preferably not larger than about 85 degrees, although it depends on the minimum incident angle αmin. As the maximum incident angle decreases from about 90 degrees, anisotropy of the crystals increases. As long as the range of the incident angles falls within about 35 degrees to about 90 degrees, a magnetic film equivalent to a conventional magnetic film can be obtained with higher productivity. By setting the range of the incident angles between about 38 degrees to about 87 degrees, more preferably between about 38 degrees to about 85 degrees, the electro-magnetic characteristic can be improved.

Thus, the invention described herein makes possible the advantages of providing a magnetic film, a method and an apparatus for producing a magnetic recording medium having a sufficient electro-magnetic conversion characteristic at a satisfactorily high productivity.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the accompanying drawings.

Figure 1A:
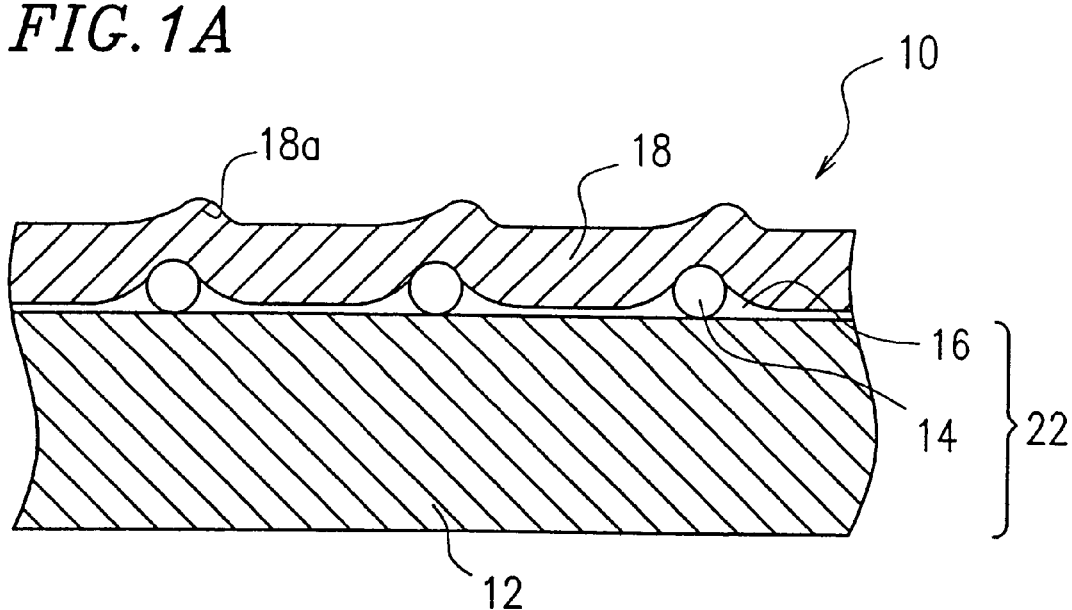
FIG. 1A is a schematic cross-sectional view of a vapor-deposition tape produced in one example according to the present invention.

FIG. 1A is a schematic cross-sectional view of a magnetic recording medium in one example according to the present invention. A vapor-deposition tape 10 as the magnetic recording medium includes a polymer film 22 and a ferromagnetic metal thin film 18. The polymer film 22, which is substantially the same as the polymer film 72 shown in FIG. 8A, includes a base film 12 and a polymer material 16 containing particles 14 (for example, silica particles) having a diameter of about 10 nm dispersed therein. Thus, the polymer film 22 has a surface roughness (i.e., projections) of about 10 nm to about 30 nm at a vapor-deposition surface thereof.

The base film 12 can be formed of a material which is appropriately selected from polyethylene terephthalate (PET), polyethylene naphthalate (PEN), polyamide, polyimide, polyvinyl chloride, polycarbonate and the like. In order to improve the running easiness, the particles 14 for providing a surface roughness to the vapor-deposition surface can be formed of an inorganic material such as, for example, $SiO_2$, $TiO_2$, $Al_2O_3$ or $ZrO_2$, or an organic material such as, for example, polysulfone. The particles 14 are typically spherical but can be of any appropriate shape. The diameter of the particles 14 (i.e., height of the projections) is preferably between about 5 nm and about 50 nm. Particles having a diameter of less than about 5 nm are difficult to be uniformly dispersed and thus may have difficulty forming a vapor-deposition surface having an appropriate surface roughness with a high reproducibility. Particles having a diameter of more than about 50 nm cause spacing loss.

The surface roughness of the ferromagnetic metal thin film 18 of the vapor-deposition tape 10, i.e., the height of projections 18a is about 1.0 to about 1.3 times the surface roughness of the vapor-deposition surface of the polymer film 22 (proximate to the diameter of the particles 14), and the absolute value of the height of the projections 18a is about 50 nm or less. In the example shown in FIG. 1A, the polymer film 22 having a surface roughness of about 30 nm is used to form the ferromagnetic metal thin film 18 having the projections 18a having a height of about 40 nm.

The magnetic materials usable for the present invention include Co, Fe, Ni, Cr, various alloys containing at least one of these metals, for example, Co—Ni, Co—Fe, Co—Cr, Co—Cu, Co—Pt, Co—Pd, Co—Sn, Co—Ni—Cr, and oxides thereof. The total thickness of the ferromagnetic metal thin film 18 is preferably about 3 nm to about 500 nm, more preferably about 5 nm to about 300 nm. When the total thickness is less than about 3 nm, the resultant vapor-deposition tape may not have satisfactory magnetic characteristics and electro-magnetic conversion characteristic. When the total thickness is more than about 500 nm, the vapor-deposition tape may have cracks, and the electro-magnetic conversion characteristic may undesirably be deteriorated in a long-wavelength region.

The surface roughness of the vapor-deposition tape 10 according to the present invention is about 1.0 to 1.3 times the surface roughness of the polymer film 22 and about 50 nm or less. Accordingly, the problem of spacing loss described regarding the conventional vapor-deposition tape is avoided. Since the surface roughness of the vapor-deposition tape 10 according to the present invention is about 1 to about 1.3 times the surface roughness of the polymer film 22, the vapor-deposition tape 10 can be formed to have a surface roughness of about 50 nm or less with a satisfactory reproducibility using a polymer film having a surface roughness of about 5 nm to about 50 nm by pre-examining the relationship between the production conditions and the degree of increase in the surface roughness of a resultant vapor-deposition tape with respect to the surface roughness of the polymer film. The production method of the vapor-deposition tape 10 will be described later.

Figure 8A:
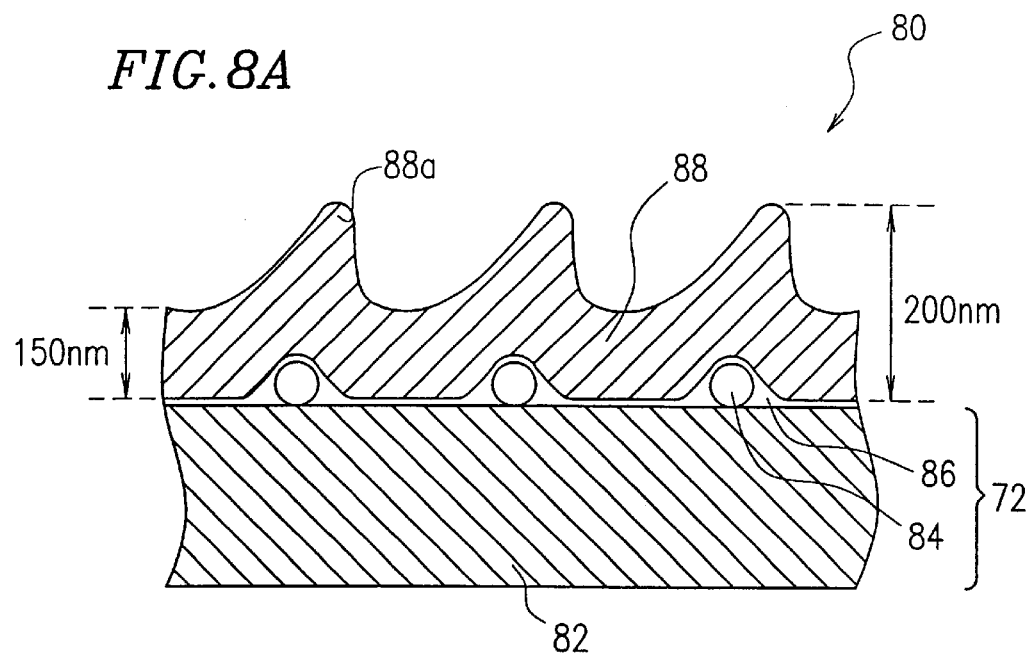
FIG. 8A is a schematic cross-sectional view of a conventional vapor-deposition tape.

The cross section in FIG. 1A is along the running direction of the polymer film 22 during the production of the vapor-deposition tape 10. The running direction is from the right to the left of the sheet of FIG. 1A. As apparent from a comparison between FIGS. 1A and 8A, the vapor-deposition tape 10 is not influenced by the shadowing as opposed to the conventional vapor-deposition tape 80 (FIG. 8A).

Figure 1B:
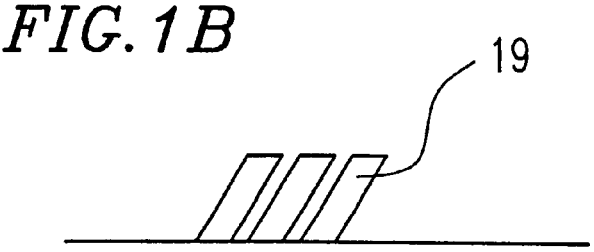
FIG. 1B is a view showing column-like crystals of a ferromagnetic metal material in the vapor-deposition shown in FIG. 1A observed by a transmission electron microscope.

FIG. 1B shows a result of observation of the ferromagnetic metal thin film 18 of the vapor-deposition tape 10 (FIG. 1A) by a TEM. As shown in FIG. 1B, column-like crystals 19 of the ferromagnetic metal are grown in a constant direction. Accordingly, the reduction in the electro-magnetic conversion characteristic described regarding the conventional vapor-deposition tape 80 (FIG. 8A) does not occur.

Figure 1C:
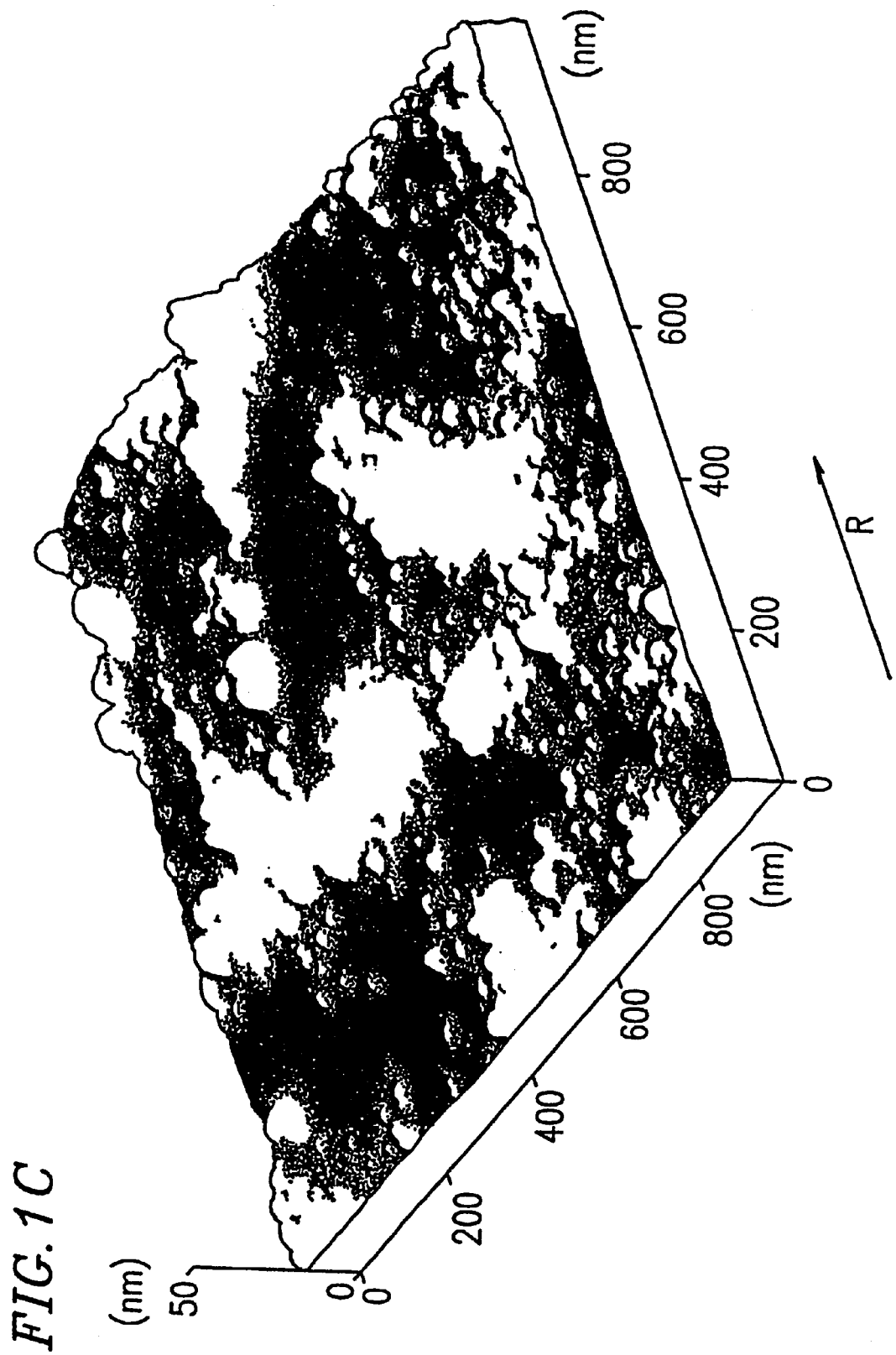
FIG. 1C is a view showing a surface state of the vapor-deposition tape shown in FIG. 1A observed by an atomic force microscope.
Figure 8B:
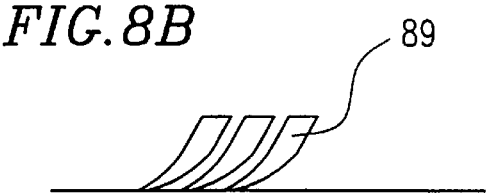
FIG. 8B is a view showing column-like crystals of a ferromagnetic metal material in the conventional vapor-deposition shown in FIG. 8A observed by a transmission electron microscope.
Figure 8C:
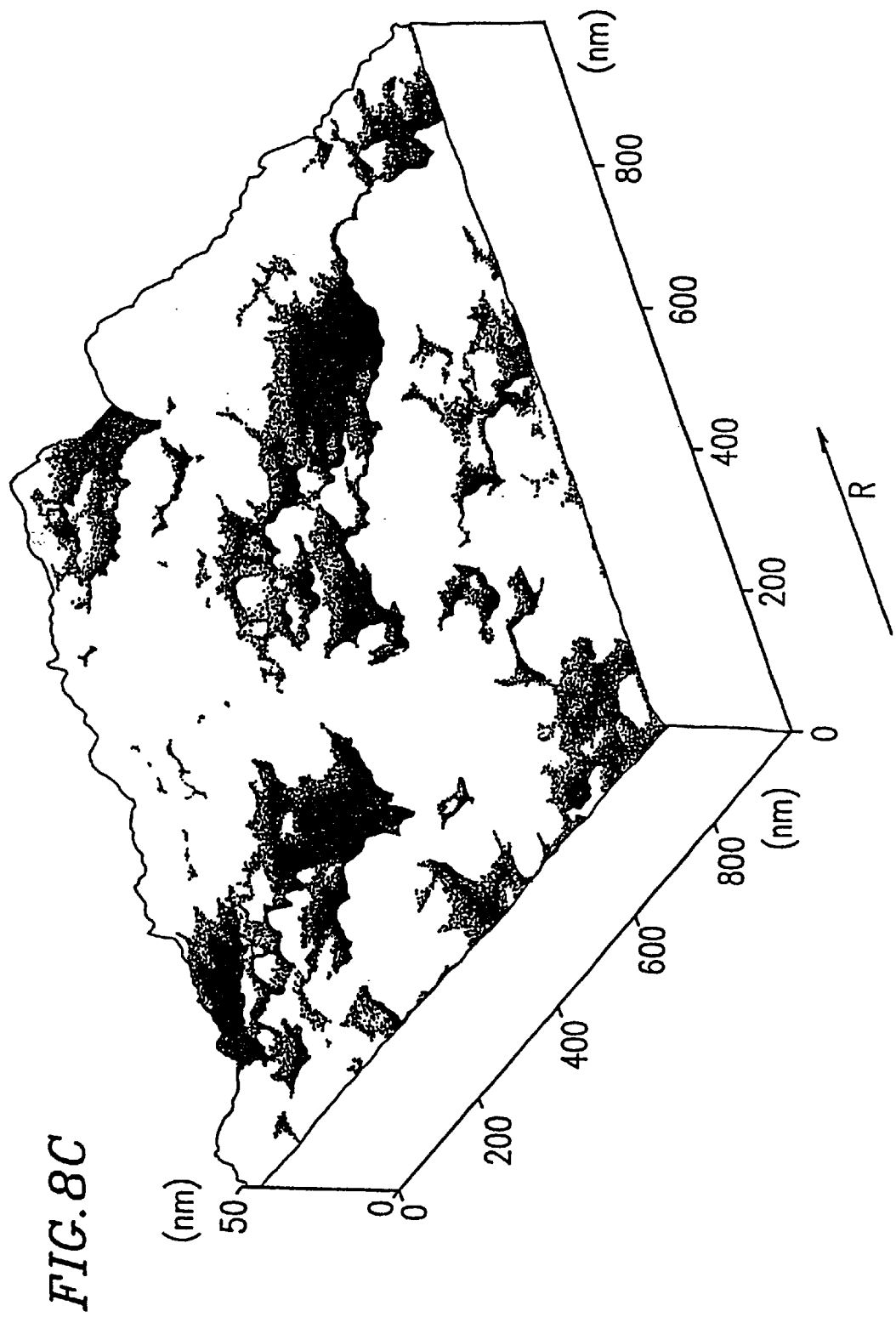
FIG. 8C is a view showing a surface state of the conventional vapor-deposition tape shown in FIG. 8A observed by an atomic force microscope.

FIG. 1C schematically shows a surface state of the vapor-deposition tape 10 (FIG. 1A) observed by an AFM. As apparent from a comparison between FIGS. 1C and 8C, there is no recessed areas (black areas) formed by shadowing rear to the projections in terms of the running direction R of the tape. It is also appreciated from FIG. 1C that the vapor-deposition tape 10 includes finer crystals arranged closely to one another and more uniformly than the conventional vapor-deposition tape 80 (FIG. 8C). The crystals of the ferromagnetic metal thin film 18 in this example which are stacked closely to one another and uniformly grown in a constant direction provide satisfactory magnetic characteristics and electro-magnetic characteristics.

The surface roughness of the vapor-deposition tapes and a particle diameter of the crystal particles described in this specification are respectively evaluated by an average value in a 30 $\mu m^2$ view and a 1 $\mu m^2$ view of an AFM. The average particle diameter of the magnetic film according to the invention (examples 1–3 described hereinafter), obtained by a 1 $\mu m^2$ view of an AFM, is around 2.5 nm and that of conventional one (comparative example 1) is about 5.5 nm, although the surface roughness of the magnetic films of the invention varies (within the range of between about 1.0 and about 1.3 times the surface roughness of the underlying polymer film) depending on the deposition conditions, as will be described below.

Moreover, as described later, the temperature of the vapor-deposition surface at the start of vapor deposition is lower than the temperature at the termination of vapor deposition according to the present invention. Accordingly, the crystal nuclei of the ferromagnetic metal are generated stably and with a high regularity, thus improving the electro-magnetic conversion characteristic.

Hereinafter, exemplary methods and apparatus for producing a vapor-deposition tape as a magnetic recording medium according to the present invention will be described in the following example. FIGS. 1A, 1B and 1C are common to the vapor-deposition tapes in the first through third examples.

EXAMPLE 1

A vapor-deposition tape in the first example includes a ferromagnetic metal oxide thin film and is formed of oblique vapor deposition using reactive vapor deposition.

Figure 2:
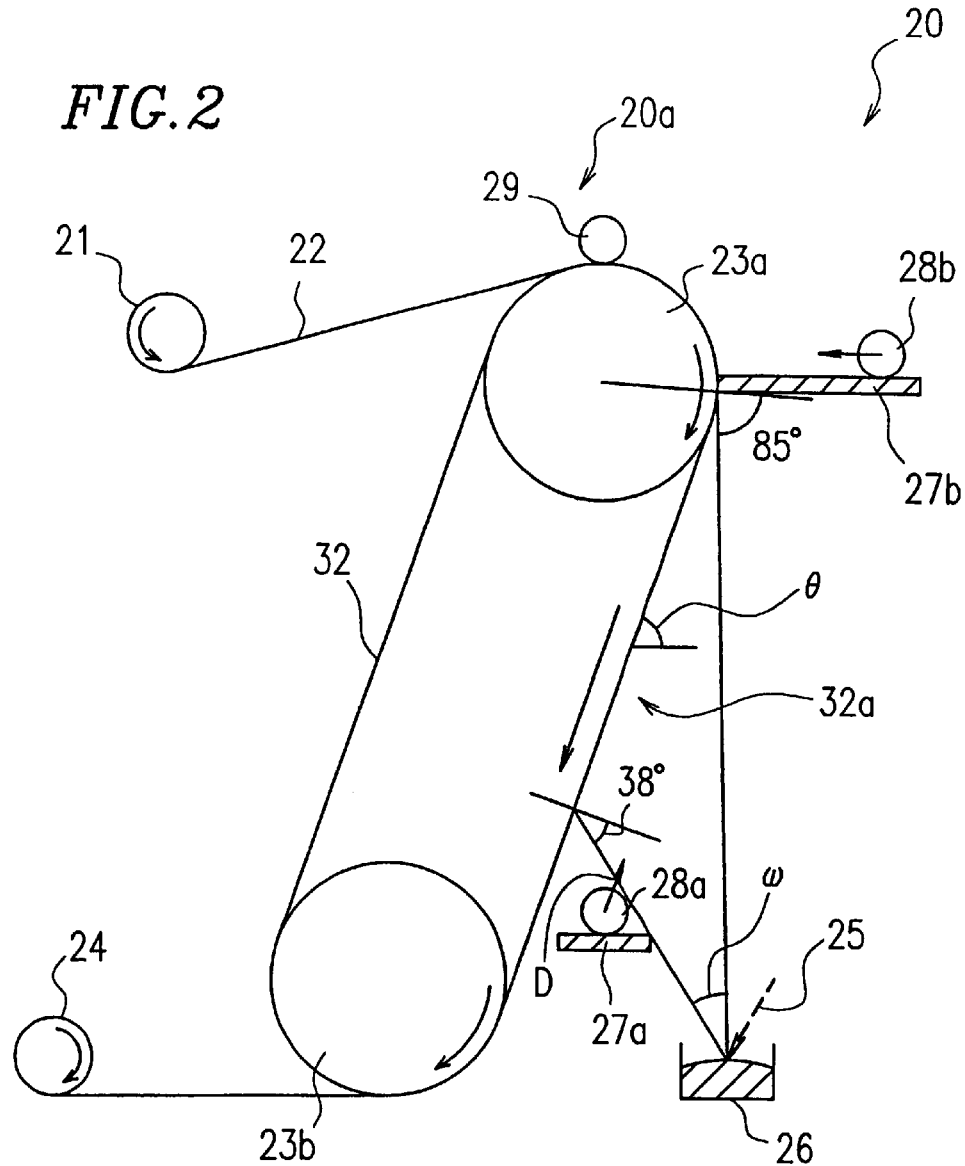
FIG. 2 is a schematic view of an apparatus for producing a magnetic recording medium in a first example according to the present invention.

FIG. 2 is a schematic view of a magnetic recording medium production apparatus (hereinafter, referred to simply as an "apparatus") 20 in the first example according to the present invention. The apparatus 20 is an endless belt system apparatus in which the polymer film 22 is run on a plate-like endless belt 32 continuously running. The plate-like belt 32 has a flat surface in contact with circumferential surfaces of an upper cooling drum 23a and a lower cooling drum 23b. While the polymer film 22 runs on the flat surface formed of the plate-like belt 32, a ferromagnetic metal oxide is deposited on the vapor-deposition surface of the polymer film 22.

The structure of the apparatus 20 will be described more specifically.

The apparatus 20 includes an endless belt 20a having a feeding shaft 21 for feeding the polymer film 22 wound therearound, the plate-like belt 32 continuously run by the upper cooling drum 23a and the lower cooling drum 23b, and a winding shaft 24 for winding the polymer film 22 having the ferromagnetic metal oxide deposited thereon. A roller 29 can be provided in order to stabilize the continuous supply of the polymer film 22 onto the circumferential surface of the upper cooling drum 23a. The cooling drums 23a and 23b, which are cylindrical, can independently control the temperature of the circumferential surface thereof by a coolant.

The ferromagnetic metal for forming a ferromagnetic metal oxide film is accommodated in a crucible 26 (vapor source) provided below a vapor-deposition area 32a of the plate-like belt 32 and irradiated with an electron beam 25 to melt and vaporize. The vaporized ferromagnetic metal reaches a vapor-deposition area 32a defined by blocking plates 27a and 27b provided between the polymer film 22 an the crucible 26. Oxygen gas is supplied from an oxygen gas supply opening 28a provided in the vicinity of the vapor-deposition surface toward the vapor-deposition surface in the direction of arrow D (substantially opposite to the running direction of the polymer film 22), thereby oxidizing the vaporized ferromagnetic metal. The resultant ferromagnetic metal oxide is deposited on the vapor-deposition surface of the polymer film 22 passing through the vapor-deposition area 32a. The oxygen gas is preferably supplied in a direction substantially opposite to the running direction of the polymer film 22 in view of a magnetic property, electro-magnetic characteristics and conservability.

The vapor-deposition area 32a is defined within a flat part of the plate-like belt 32 and is determined so that the tilt angle θ made by the vapor-deposition surface of the polymer film 22 end the horizontal direction (i.e., the direction of the melting surface of the ferromagnetic metal in the crucible 26) is about 55 degrees in the vapor-deposition area 32a. The tilt angle θ is constantly about 55 degrees in the entirety of the vapor-deposition area 32a and the change Δθ of the tilt angle θ is about 0 in the vapor-deposition area 32a. The "tilt angle" is defined with respect of the horizontal direction.

Figure 7:
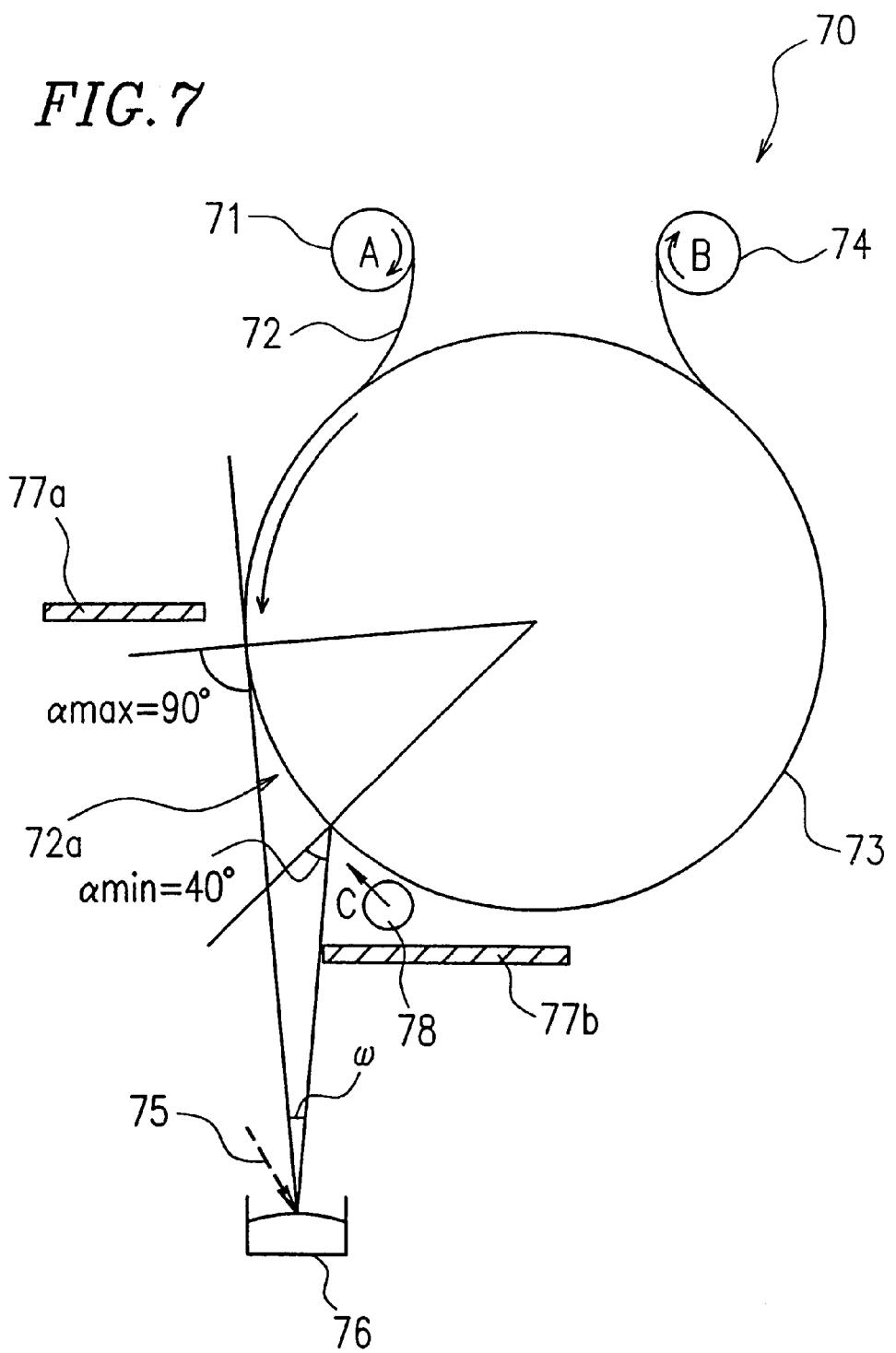
FIG. 7 is a schematic view of another conventional apparatus for producing a magnetic recording medium.

In the vapor-deposition area 32a in this example, the minimum incident angle αmin. is about 38 degrees and the maximum incident angle αmax. is about 85 degrees. The polymer film 22 runs in such a direction that the incident angle α is minimum at the vapor-deposition starting end and maximum at the vapor-deposition terminating end of the vapor-deposition area 32a. The vapor-deposition expanding angle ω defined by the maximum and minimum incident angles is about 34 degrees, and the adhering efficiency calculated based on $cos^3$ of the vapor-deposition expanding angle ω is about 45%. Such a value of the adherence efficiency is significantly higher than the value of 10% in the conventional method and apparatus 70 (FIG. 7).

In this example, the temperature (T1) of the upper cooling drum 23a is set to be about –20° C. and the temperature (T2) of the lower cooling drum 23b is set to be about –10° C., so that the temperature of the vapor-deposition surface at the start of vapor deposition is lower than the temperature of the vapor-deposition surface at the termination vapor deposition. Accordingly, the crystal nuclei are more stably generated than in the conventional method and apparatus 70. As a result, satisfactory magnetic characteristics and electro-magnetic conversion characteristic are obtained. As shown with the following samples, the temperature of the vapor-deposition surface increases as the vapor deposition proceeds by the influence of the ferromagnetic metal. Accordingly, the above-described effects are reduced when the temperatures T1 and T2 of the cooling drums 23a and 23b are equal to each other. The temperature of the vapor-deposition surface at the start of vapor deposition needs to be set lower than room temperature, which is used conventionally. The range of temperature T1 of the upper cooling drum 23a, which may be set taking a heat resistance of the material used for the polymer film 22 into consideration, is preferably set between about −20° C. to about +30° C. for a PET film, for example.

<Sample 1—1>

Using the apparatus 20 shown in FIG. 2, a vapor-deposition tape was produced. As the polymer film 22, a film including a PET film and $SiO_2$ particles dispersed thereon to have a surface roughness of about 32 nm was used. As the ferromagnetic metal material, a Co—Ni alloy was used. While the polymer film 22 was run at the speed of about 200 m/min. and oxygen gas was supplied, the ferromagnetic metal oxide thin film was deposited on the polymer film 22 to a thickness of about 150 nm. In this example, the maximum possible deposition speed is about 2 μm/sec. The resultant film was cut to produce the vapor-deposition tape for use as digital videotape (sample 1—1).

The resultant vapor-deposition tape was evaluated by the following criteria. The evaluation method is common to the other examples and comparative examples described below.

Surface roughness: Observed by an AFM as described above and an average surface roughness obtained. Table 1 below shows the relative value with respect to the surface roughness of the polymer film in the parenthesis. The average surface roughness of the polymer film before the formation of the ferromagnetic metal thin film was about 32 nm in all the examples and comparative examples described in this specification.

State of crystals: A fracture surface of the vapor-deposition tape was observed by a TEM at a magnification of 500,000×, and the shape and the regularity of the crystals were qualitatively evaluated. In Table 1, symbol ○ indicates that the vapor-deposition tape has both a satisfactory crystal shape and a high regularity, and symbol × indicates that at least one of the shape and regularity of the vapor-deposition tape is unsatisfactory.

Adherence efficiency: Calculated based on $\cos^3$ of the vapor-deposition expanding angle ω with the width of the crucible and the width of the film being set indefinite.

Magnetic property: Remanent flux density (unit in Gauss), coercive force (unit in Oersted) and square ratio (remanent flux density/saturation flux density) of the vapor-deposition tape were observed.

Electro-magnetic conversion characteristic: Evaluated with a commercially available digital video deck altered into an evaluation deck. Color output and noise ratio at about 20 MHz were obtained and compared with the results obtained with the comparative example described below.

Friction coefficient: Evaluated with a commercially available digital video deck altered into an evaluation deck. The friction coefficient uk before and after repeated running tests were measured.

Evaluation results obtained with the vapor-deposition in the first example are shown in Table 1.

TABLE 1

| Sample | Example 1 | | | Example 2 | Example 3 | Comparative example 1 | Comparative example 2 |
| --- | --- | --- | --- | --- | --- | --- | --- |
| | 1-1 | 1.2 | 1-3 | 2-1 | 3-1 | | |
| θ | 55° | 70° | 30° | 50° | 55°/70° | 55°~90° | — |
| αmin/αmax | 38°/85° | 40°/85° | 38°/98° | 40°/90° | 38°/90° | 40°/90° | −5°/15° |
| ω | 34° | 20° | 45° | 38° | 13°/6° | 15° | 15° |
| T1/T2 | −20° C./−10° C. | −20° C./−10° C. | −20° C./−20° C. | −20° C./−10° C. | −10° C./−20° C. | −20° C. | 200° C. |
| Surface roughness | About 35 nm (about 1.09) | About 38 nm (about 1.19) | About 33 nm (about 1.03) | About 34 nm (about 1.06) | About 41 nm (about 1.28) | About 48 nm (about 1.5) | About 38 nm (about 1.19) |
| State of crystals | ○ (column) | ○ (column) | ○ (column) | ○ (column) | ○ (arc) | X (arc) | X (arc) |
| Adhering efficiency (Vapor-deposition speed) | 3 | 2 | 5 | 4 | 1.5 | 1 | 2 |
| Magnetic property | | | | | | | |
| Remanant flux density | 4000 Gauss | 4200 Gauss | 3600 Gauss | 3700 Gauss | 3700 Gauss | 3500 Gauss | — |
| Coersive force | 1550 Öe | 1830 Öe | 1300 Öe | 1500 Öe | 1400 Öe | 1200 Öe | — |
| Square ratio | 0.75 | 0.82 | 0.70 | 0.73 | 0.72 | 0.68 | — |
| Electric-magnetic characteristic (dB) | +3 | +4 | +0.8 | +2.3 | +0.5 | 0 | −5 |
| Friction coefficient | 0.21 | 0.20 | 0.22 | 0.21 | 0.22 | 0.20 | 0.25 |

When the maximum incident angle αmax. was changed to about 87 degrees and about 90 degrees while maintaining the other conditions, the results where as satisfactory as in Table 1 except that the electro-magnetic characteristic was changed to about +2.4 dB. It should be noted that in the case where αmin. is less than about 38 degrees, the magnetic property may be deteriorated (e.g., coercive force of about 1100 Oe, square ratio of about 0.68), the magnetic tape may not have satisfactory electro-magnetic characteristics. In addition, in the case where αmin. is less than about 35 degrees, it may be difficult to use the obtained magnetic tape for a video tape. Therefore, accordingly to the present invention, αmin. is preferably not less than about 35 degrees and more preferably not less than about 38 degrees.

<Sample 1-2>

Using the apparatus 20 shown in FIG. 2, another vapor-deposition tape was produced. As the polymer film 22, a film including a PEN film was used. The tilt angle θ of the plate-like belt 32 was about 70 degrees, the temperature T2 of the lower cooling drum 23b was about −15° C., the minimum incident angle αmin. was about 40 degrees, the maximum incident angle αmax. was about 85 degrees, and the vapor-deposition expanding angle ω was about 20 degrees. The running speed of the polymer film 22 was about 150 m/min. With other conditions being the same as those of sample 1—1, the ferromagnetic metal oxide thin film was deposited on the polymer film 22 to a thickness of about 150 nm, thereby obtaining sample 1-2. The evaluation results of sample 1-2 are shown in Table 1.

<Sample 1-3>

Using the apparatus 20 shown in FIG. 2, a still another vapor-deposition tape was produced. As the polymer film 22, a film including an aramid film (PPTA) was used. The tilt angle θ of the plate-like belt 32 was about 30 degrees, the temperature T2 of the lower cooling drum 23b was about −20° C., the minimum incident angle αmin. was about 38 degrees, the maximum incident angle αmax. was about 90 degrees, and the vapor-deposition expanding angle ω was about 45 degrees. The running speed of the polymer film 22 was about 300 m/min. With other conditions being the same as those of sample 1—1, the ferromagnetic metal oxide thin film was deposited on the polymer film 22 to a thickness of about 150 nm, thereby obtaining sample 1-3. The evaluation results of sample 1-3 are shown in Table 1.

According to this example of the invention, a magnetic tape, shown in FIGS. 1A to 1C, having a satisfactory performance can be obtained with high productivity. As is apparent from Table 1, sample 1—1 to sample 1-3 of this example, in comparison with comparative example 1 described below, is obtained with higher productivity (2 times greater adherence efficiency) and has better magnetic property and electro-magnetic characteristics. Sample 1-2 obtained with high tilt angle (about 70 degrees) is superior in a magnetic property and electro-magnetic characteristics. Sample 1-3 obtained with low tilt angle (about 30 degrees) is superior in adherence efficiency. A magnetic property and electro-magnetic characteristics of sample 1—1 obtained with intermediate tilt angle (about 55 degrees) has intermediate values between those of samples 1-2 and 1-3. Therefore, it is understood from these results that the magnetic property and electro-magnetic characteristics can be improved by increasing the tilt angle and the adherence efficiency can be improved by decreasing the tilt angle.

Figure 3:
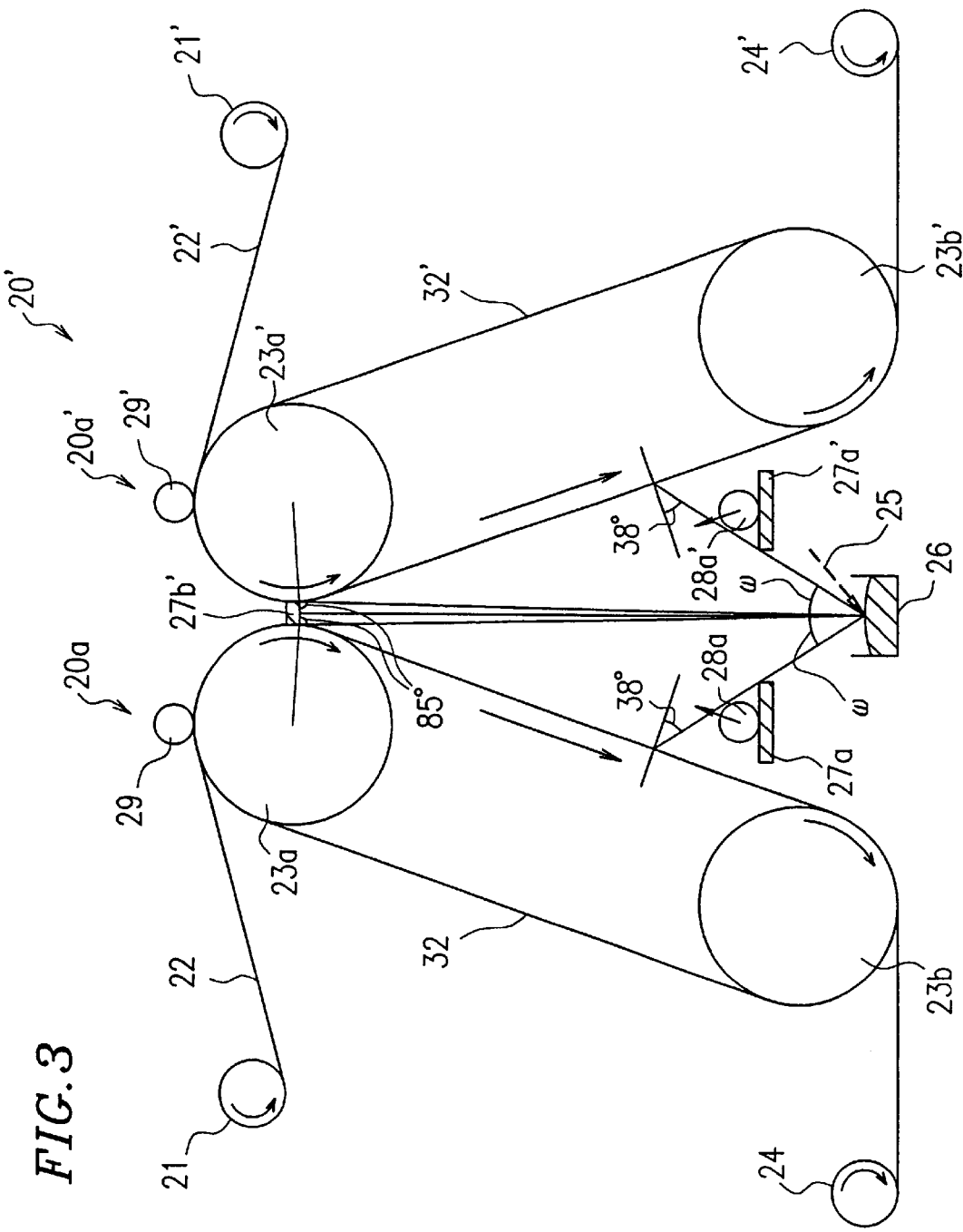
FIG. 3 is a schematic view of another apparatus for producing a magnetic recording medium in the first example according to the present invention.

FIG. 3 is a schematic view of an apparatus 20' obtained by modifying the apparatus 20. The apparatus 20' provides a productivity twice as high as that of the apparatus 20. The apparatus 20' includes the endless belt 20a and also another endless belt 20a' having the same structure as that of the endless belt 20a. The two endless belts 20a and 20a' are provided symmetrically with respect to the crucible 26. The elements regarding the endless belt 20a' are represented by the same reference numerals added with "'" as those of the elements regarding the endless belt 20a, and detailed descriptions thereof will be omitted.

As described above, in the first example, a magnetic recording medium shown in FIGS. 1A, 1B and 1C is produced with a satisfactory productivity.

EXAMPLE 2

Figure 4:
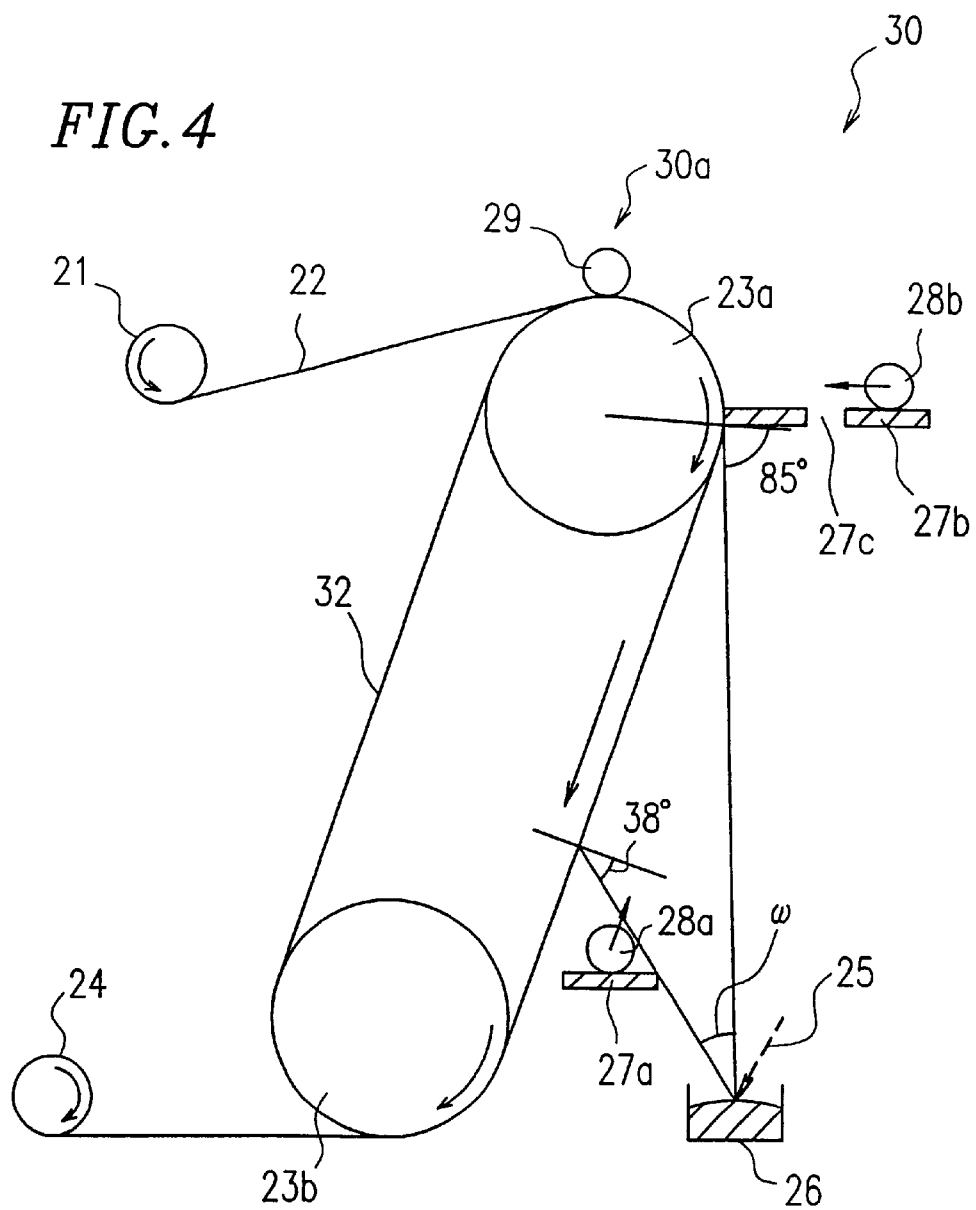
FIG. 4 is a schematic view of an apparatus for producing a magnetic recording medium in a second example according to the present invention.

FIG. 4 is a schematic view of a magnetic recording medium production apparatus (hereinafter, referred to simply as an "apparatus") 30 in the second example according to the present invention. Elements having identical functions previously discussed with respect to FIG. 2 bear identical reference numerals and the descriptions thereof will be omitted.

The apparatus 30 is different from the apparatus 20 in that the blocking plate 27b of the apparatus 30 has a slit 27c. A vapor stream of the ferromagnetic metal is guided to an area above the blocking plate 27b through the slit 27c and deposited on the polymer film 22. Thus, the electro-magnetic conversion characteristic is further improved.

<Sample 2-1>

Using the apparatus 30 shown in FIG. 4, a vapor-deposition tape was produced. As the polymer film 22, a film including a PEN film was used. The tilt angle θ of the plate-like belt 32 was about 30 degrees, the temperature T2 of the lower cooling drum 23b was about −20° C., the minimum incident angle αmin. was about 40 degrees, the maximum incident angle αmax. was about 85 degrees, and the vapor-deposition expanding angle ω was about 50 degrees. With other conditions being the same as those of sample 1—1, the ferromagnetic metal oxide thin film was deposited on the polymer film 22 to a thickness of about 150 nm, thereby obtaining sample 2-1. The evaluation results of sample 2-1 are shown in Table 1.

According to this example of the invention, a magnetic tape, shown in FIGS. 1A to 1C, having a satisfactory performance can be obtained with high productivity. The productivity can be doubled by modifying the apparatus 30 in the same manner as in FIG. 3.

EXAMPLE 3

Figure 5:
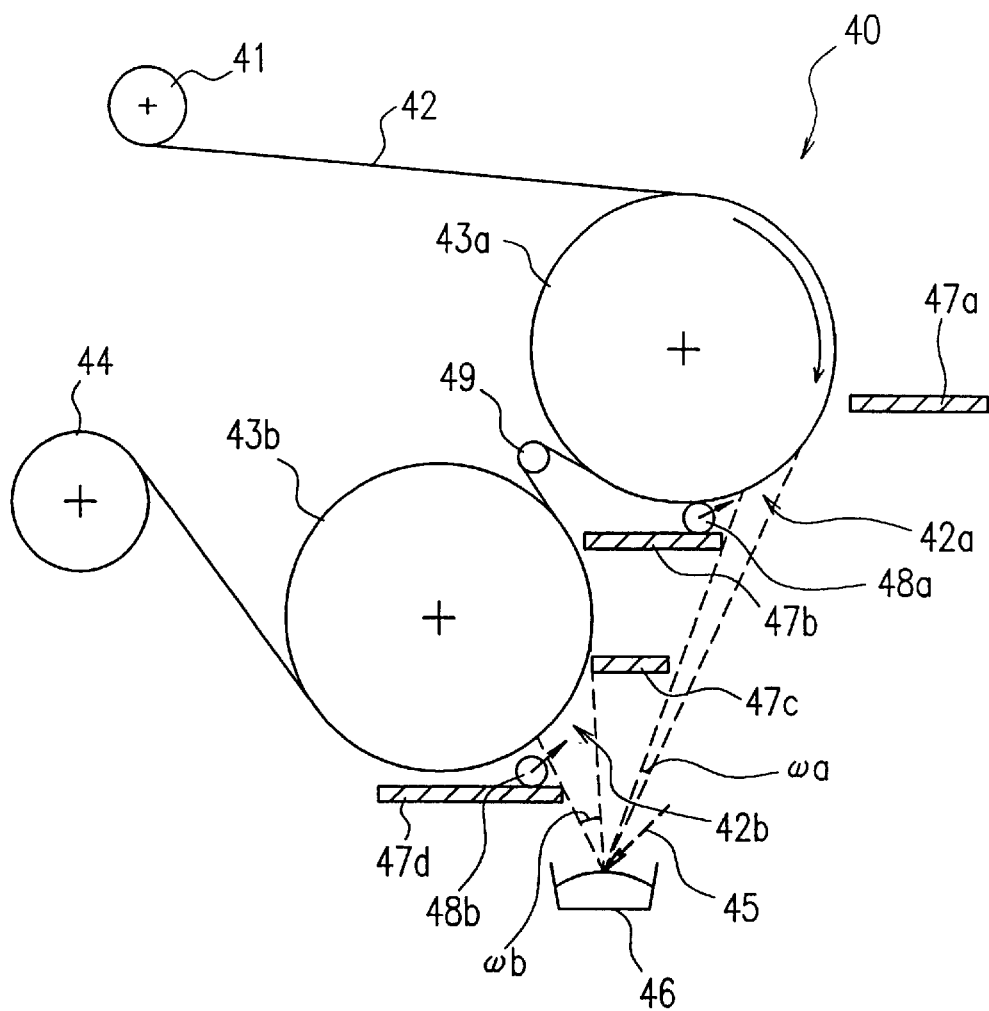
FIG. 5 is a schematic view of an apparatus for producing a magnetic recording medium in a third example according to the present invention.

FIG. 5 is a schematic view of a magnetic recording medium production apparatus (hereinafter, referred to simply as an "apparatus") 40 in the third example according to the present invention.

The apparatus 40 does not have a plate-like endless belt. A polymer film 42 runs on circumferential surfaces of two cooling drums 43a and 43b. A ferromagnetic metal thin film is deposited on a vapor-deposition surface of the polymer film 42.

The apparatus 40 operates in the following manner.

The polymer film 42 is fed out from a feeding shaft 41 and transported at a constant speed on the cooling drums 43a (temperature T1: about 10 degrees) and 43b (temperature T2: about 20 degrees) while being extended by a roller 49 provided between the cooling drums 43a and 43b. Then, the polymer film 42 is wound around a winding shaft 44. The ferromagnetic metal accommodated in a crucible 46 provided opposite to the vapor-deposition surface of the polymer film 42 is irradiated with an electron beam 45 to melt and vaporized. The vaporized ferromagnetic metal reaches a vapor-deposition area 42a defined by blocking plates 47a and 47b and a vapor-deposition area 42b defined by blocking plates 47c and 47d and deposited to the vapor-deposition surface passing through the vapor-deposition areas 42a and 42b. As in the first example, the ferromagnetic metal can be oxidized so as to deposit a ferromagnetic metal oxide on the polymer film 42 by supplying oxygen gas from an oxygen gas supply openings 48a and 48b in the direction opposite to the running direction of the polymer film 42.

The polymer film 42 runs in such a direction that the incident angle of the ferromagnetic metal in the vapor-direction areas 42a and 42b is in the range of about 38 to about 90 degrees and that the vapor-deposition expanding angle ω is not smaller than about 18 degrees. More specifically, the vapor-deposition expanding angle ωa is about 6 degrees and vapor-deposition expanding angle ωb is about 13 degrees. That is, overall vapor-deposition expanding angle ωa+ωb=about 19, which is larger than 18 degrees. The tilt angle θ of the vapor-deposition surface within a vapor-deposition area 42a is between about 25 degrees and about 55 degrees, and the tilt angle θ of the vapor-deposition surface within a vapor-deposition area 42b is between about 40 degrees and about 70 degrees (in Table 1, maximum tilt angles are indicated). The change in the tilt angles (Δθ) in respective vapor-deposition areas 42a and 42b is about 30 degrees. The change in the tilt angle is preferably not larger than 30 degrees to obtain satisfactory crystals. In the case where the tilt angle is larger than 30 degrees, the shape of the crystals are largely deformed, as shown in FIG. 8B regarding a conventional method, to have an arc shape crystal (a crystal having a curved surface), and results in poor electro-magnetic characteristics. In the example shown in FIG. 5, the adherence efficiency of about 20% is obtained.

The vapor-deposition conditions for more than two vapor-deposition areas are not limited to the above. The only requirements are that the respective incident angles α of the ferromagnetic metal are between about 35 degrees and about 90 degrees, and the total vapor-deposition angle is not smaller than 18 degrees. In addition, the respective tilt angles should be in the range between 20 degrees and 80 degrees. As described in Example 1, a larger tilt angle provides a better magnetic property and electro-magnetic characteristics, while decreasing the adherence efficiency. On the other hand, a smaller tilt angle provides a better adherence efficiency, while deteriorating magnetic property and electro-magnetic characteristics. Therefore, in view of the above relationship, the tilt angle may be set in accordance with the use of the magnetic recording medium. The vapor-deposition conditions may be set equal among a plurality of vapor-deposition areas and may be different.

<Sample 3-1>

Sample 3-1 was produced by the apparatus 40 shown in FIG. 5. A PEN film was used as the polymer film 42. The temperature T1 of the upper cooling drum 43a was set to be about 10° C. and the temperature T2 of the lower cooling drum 43b was set to be about 20° C. With other conditions being the same as those of sample 1—1, the ferromagnetic metal oxide thin film was deposited on the polymer film 42 to a thickness of about 150 nm, thereby obtaining sample 3-1. The evaluation results of sample 3-1 are shown in Table 1.

As can be appreciated from Table 1, when the apparatus 40 including a drum is used, it is possible to obtain a magnetic tape having satisfactory electro-magnetic characteristics with higher productivity than that of a conventional method by appropriately setting the tilt angles θ of the vapor-deposition areas and the incident angles α of the ferromagnetic material, and the vapor-deposition expanding angles ω in accordance with the invention. In the case where a vapor-deposition area is set on a surface of a drum, since a tilt angle θ changes from the deposition starting end to the deposition terminating end of the vapor deposition area, the crystals tend to have an arc shape. However, by setting the change in the tilt angle not to be greater than about 30 degrees, the a magnetic tape having better electro-magnetic characteristics than that produced by a conventional method can be obtained.

COMPARATIVE EXAMPLE 1

A vapor-deposition tape was produced using the apparatus 70 shown in FIG. 7. As the polymer film 72, a film including a PET film was used as sample 1—1, in the first example. The temperature of the cooling drum 73 was −20° C., the minimum incident angle αmin. was 40 degrees, the maximum incident angle αmax. was 90 degrees, and the vapor-deposition expanding angle ω was about 15 degrees. The ferromagnetic metal material used and the flow rate of oxygen gas were the same as those in the first example. While the polymer film 72 was running at the speed of about 60 m/min., the ferromagnetic metal thin film was deposited on the polymer film 72 to a thickness of about 150 nm. The evaluation results of the resultant film are shown in Table 1.

The vapor-deposition tape obtained by comparative example 1 has a cross sectional structure shown in FIG. 8A. According to the conventional method shown in FIG. 7, the incident angle α of the ferromagnetic metal is large and the deposition speed is low at the deposition starting end in the deposition area 72a. The incident angle α is decreased and the deposition speed is raised as the deposition terminating end is approached. As a result, the projections are developed from the forward end of the running direction and as a result, a recessed area where the ferromagnetic metal is not sufficiently supplied (i.e., shadow) is formed rear to the projections. An AFM observation result reveals that, as shown in FIG. 8C, recessed areas (black areas) are formed by shadowing rear to the projections in terms of the running direction R of the tape. Due to this shadowing effect, the surfaces roughness of the vapor-deposition tape becomes about 48 nm, which is about 1.5 times larger than that of the polymer film, and causes the problem of spacing loss. In addition, by the AFM observation of the surface of the vapor-deposition tape, the average particle diameter of the crystals was about 5.5 nm, which is larger than two times that of examples 1-3 (i.e., about 2.5 nm). It is considered that this also deteriorates the electro-magnetic characteristics.

In the vapor-deposition tape, from the result of observation by a transmission electron microscope (TEM) as shown in FIG. 8B, the surface of the column-like crystals is largely curved so that the width of the column increases as the surface of the tape is approached. Such a phenomenon is considered to occur since the incident angle α and thus the deposition speed do not linearly change with respect to time due to the running of the polymer film 72 on the circumferential surface of the cylindrical cooling drum 73 according to the conventional method as shown in FIG. 7. Since the column-like crystals of the ferromagnetic metal shown in FIG. 8B are not grown in a constant direction, the vapor-deposition tape is low in anisotropy and thus is low in electro-magnetic characteristics. In Example 3, the column-like crystals of the ferromagnetic metal also have a curved surface (i.e., are shape) but the curvature is less than that of comparative example 1.

COMPARATIVE EXAMPLE 2

Figure 6:
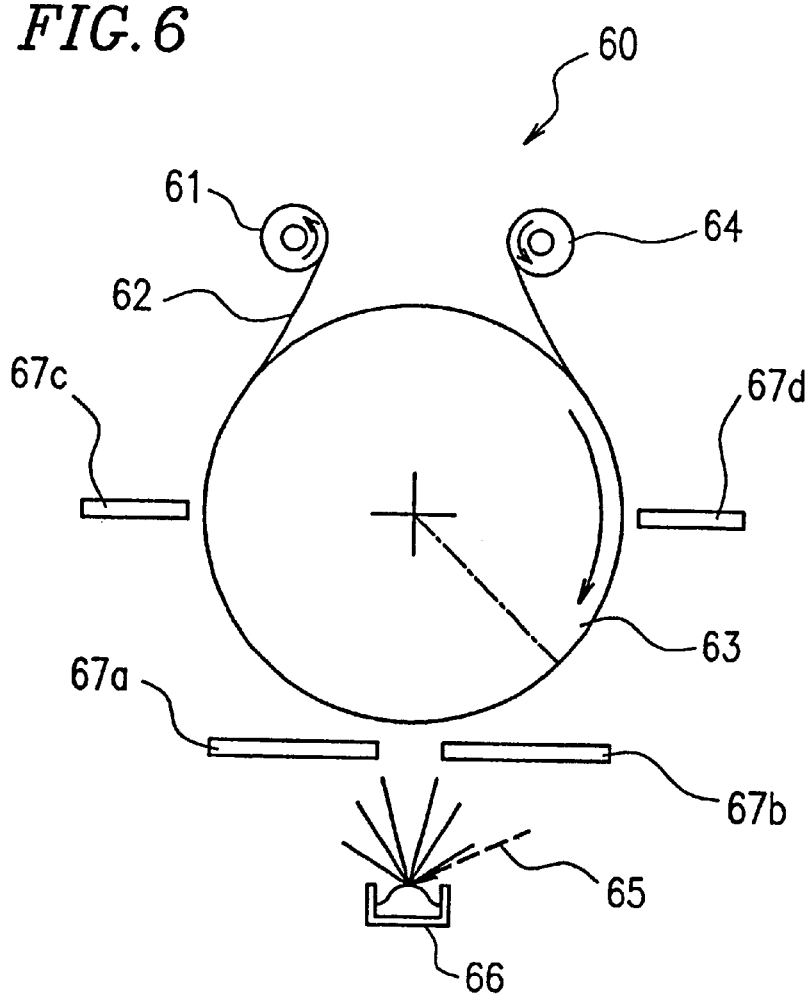
FIG. 6 is a schematic view of a conventional apparatus for producing a magnetic recording medium.

FIG. 6 shows an apparatus 60 used in a second comparative example for producing a magnetic recording medium. In this comparative example, vertical vapor deposition is used.

The apparatus 60 operates in the following manner. A polymer film 62 including an aramid (PPTA) film is set around a feeding shaft 61 and transported on a cooling drum 63 to be wound around a winding shaft 64. In a vertical vapor deposition method, a deposition temperature is required to grow satisfactory crystals. Therefore, an aramid film, which has high heat resistance, is used in this comparative example. A ferromagnetic Co—Cr alloy accommodated in a crucible 66 is irradiated with an electron beam 65 to melt and vaporize. The vaporized ferromagnetic Co—Cr alloy is deposited on the polymer film 62 vertically from the below. The incident angle of the ferromagnetic Co—Cr alloy is restricted to the range of −5 degrees to +15 degrees by blocking plates 67a and 67b. The total thickness of the ferromagnetic metal alloy thin film was deposited to a thickness of about 150 nm. The adherence efficiency of vapor deposition was about 20% according to the calculation. In comparative example 2, since the crystals formed by a vaticle vapor deposition method do not have anisotropy in the tape plane, the magnetic property and the electromagnetic characteristics cannot be evaluated in the same manner as in Examples 1–3 and comparative example 1, which forms a magnetic tape having anisotropy in the tape plane.

In the above-described examples, as the materials for the base film, PET, PEN, or PPTA (aromatic amid, i.e., aramid) is used. Other materials such as, for example, polyamide (other than aramid), polyimide, polyvinyl chloride, or polycarbonate can be used. In the case where high heat-resistance is required, heat resistant polymers such as aramid or polyimide should be used in accordance with the required temperature.

As described above, the adherence efficiency of vapor deposition is sacrificed by the conventional method in order to obtain a sufficient electro-magnetic characteristic. According to the present invention, a method and apparatus for producing a magnetic recording medium with a higher productivity than the conventional method and apparatus while maintaining the electro-magnetic conversion characteristic at least at the level available with the conventional method and apparatus.

Specifically, the oblique vapor deposition is performed in the state where the plate-like endless belt is provided at an optimum angle θ with respect to the horizontal direction and the vapor-deposition expanding angle ω made by the center of the crucible and the blocking plate is enlarged. In this manner, a large portion of the vaporized ferromagnetic metal is deposited on the vapor-deposition surface of the polymer film, and thus a high adherence efficiency is obtained.

An apparatus according to the present invention is not limited to the above-described structures. For example, the structure relating to the plate-like endless belt can be altered in any way as long as the least cooling drums are included. The cooling effect can be improved by increasing the number of cooling drums or changing the diameter of the cooling drums. A tension roller or the like can be provided in order to enhance the tensile strength of the plate-like endless belt. The running state of the plate-like endless belt can be stabilized by use of a cooling drum having a crown drum-type cross section, providing of a guide to the plate-like endless belt and the roller or provision of an edge position control (EPC).

Regarding the surface roughness of the underlying polymer film, although the surface roughness in the range of about 5 nm to 50 nm is described in the present specification, the appropriate surface roughness is determined in view of the relationship between the recording medium and the system using the recording medium. The present invention can be applied to a recording medium, which will be developed in the future, having a smaller surface roughness. For example, in a hard disk system, where the recording medium and a sliding portion of a magnetic head do not contact with each other, it is not necessary to provide a surface roughness to the polymer film.

Two or more oxygen gas supply openings can be provided. Oxygen, nitrogen, hydrogen, ozone argon or other types of gases can be used independently or as a mixture thereof. Alternatively, reactive vapor deposition using any other reactive gas can be performed. The positional relationship among the blocking plates, the oxygen gas supply opening(s), the cooling drums, the plate-like endless belt(s) is not limited to those in the above-described examples.

The present invention is applicable to an in-plane magnetic recording medium as described above, and is also applicable to other uses which require crystals to be grown in a tilting direction with respect to a vapor-deposition surface. For example, the present invention is applicable to oblique vapor deposition using $SiO_2$ for aligning liquid crystal materials in a prescribed direction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a magnetic recording medium, comprising the steps of:

causing a polymer film having a vapor-deposition surface to run along a running path;

vaporizing a ferromagnetic metal material;

depositing a thin film including the ferromagnetic metal material to the vapor-deposition surface of the polymer film in a vapor-deposition area where the polymer film runs with a tilt angle (θ), with respect to a horizontal direction, in the range of about 20 degrees or more and about 80 degrees or less by oblique vapor deposition, wherein a temperature at a vapor-deposition starting end of the vapor-deposition area is lower than a temperature at a vapor-deposition terminating end of the vapor-deposition area.

2. A method for producing a magnetic recording medium according to claim 1, wherein the polymer film is run so that the tilt angle (θ) of the polymer film in the vapor-deposition area changes by about 30 degrees or less.

3. A method for producing a magnetic recording medium according to claim 2, wherein the polymer film is run so that the tilt angle (θ) of the polymer film is constant throughout the vapor-deposition area.

4. A method for producing a magnetic recording medium according to claim 3, wherein the polymer film is run on a plate-like endless belt continuously running on at least two cooling drums.

5. A method for producing a magnetic recording medium according to claim 1, wherein a vapor-deposition expanding angle (ω) of the ferromagnetic metal material incident on the vapor-deposition area is set to be in the range of about 18 degrees or more and about 60 degrees or less.

6. A method for producing a magnetic recording medium according to claim 1, wherein the polymer film is run so that an incident angle (α) of the ferromagnetic metal material incident on the vapor-deposition area with respect to the normal to the vapor-deposition surface is larger at a vapor-deposition starting end that at a vapor-deposition terminating end of the vapor-deposition area.

7. A method for producing a magnetic recording medium according to claim 6, wherein the incident angle (α) of the ferromagnetic metal material incident on the vapor-deposition area with respect to the normal to the vapor-deposition surface is set to be about 35 degrees or more.

8. A method for producing a magnetic recording medium according to claim 4, wherein the plate-like endless belt is set to have a surface temperature lower at a vapor-deposition starting end than at a vapor-deposition terminating end of the vapor-deposition area.

9. A method for producing a magnetic recording medium, comprising the steps of:

causing a polymer film having a vapor-deposition surface to run along a running path;

vaporizing a ferromagnetic metal material;

depositing a thin film including the ferromagnetic metal material to the vapor-deposition surface of the polymer film in a vapor-deposition area by oblique vapor deposition so that the ferromagnetic metal material is incident on the vapor-deposition surface of the polymer film in an area where an incident angle (α) of the ferromagnetic material with respect to the normal to the vapor-deposition surface is in the range of about 35 degrees to about 90 degrees, wherein a temperature at a vapor-deposition starting end of the vapor-deposition area is lower than a temperature at a vapor-deposition terminating end of the vapor-deposition area.

10. An apparatus for producing a magnetic recording medium, comprising:

first and second cooling drums;

a plate-like endless belt held on the first and second cooling drum to be run; and a vapor source for supplying a vaporized ferromagnetic metal material to a vapor-deposition surface of a polymer film run along a surface of the plate-like endless belt, wherein the vaporized ferromagnetic metal material reaches to a vapor-deposition area where the polymer film is run with a tilt angle (θ), with respect to a horizontal direction, in the range of about 20 degrees or more and about 80 degrees or less, and wherein the plate-like endless belt has a surface temperature lower at a vapor-deposition starting end of the vapor-deposition area than at a vapor-deposition terminating end of the vapor-deposition area.

11. An apparatus for producing a magnetic recording medium according to claim 10, wherein a vapor-deposition expanding angle (ω) of the ferromagnetic metal material incident on the vapor-deposition area is in the range of about 18 degrees or more and about 60 degrees or less.

12. An apparatus for producing a magnetic recording medium according to claim 10, wherein an incident angle (α) of the ferromagnetic metal material incident on the vapor-deposition area with respect to the normal to the vapor-deposition surface is about 35 degrees or more.

13. An apparatus for producing a magnetic recording medium, comprising:

first and second cooling drums;

a plate-like endless belt held on the first and second cooling drum to be run; and a vapor source for supplying a vaporized ferromagnetic metal material to a vapor-deposition surface of a polymer film run on a surface of the plate-like endless belt, wherein the ferromagnetic metal material is incident on the vapor-deposition surface of the polymer film in an area where an incident angle (α) of the ferromagnetic material with respect to the normal to the vapor-deposition surface is in the range of about 35 degrees to about 90 degrees, and wherein the plate-like endless belt has a surface temperature lower at a vapor-deposition starting end of the vapor-deposition area than at a vapor-deposition terminating end of the vapor-deposition area.

14. A magnetic recording medium, comprising:

a polymer film including a surface having an average surface roughness of about 5 nm to about 50 nm; and a magnetic thin film including a ferromagnetic metal material obliquely vapor-deposited on the surface of the polymer film, wherein the ratio of the average surface roughness of the ferromagnetic thin film with respect to the average surface roughness of the polymer film is in the range of about 1.0 to about 1.3.

15. A magnetic recording medium according to claim 14, wherein the ferromagnetic thin film has a thickness in the range of about 5 nm to about 300 nm.

* * * * *